(No Model.)
W. F. WILLIAMS.
ELASTIC TIRE.
No. 598,043. Patented Jan. 25, 1898.
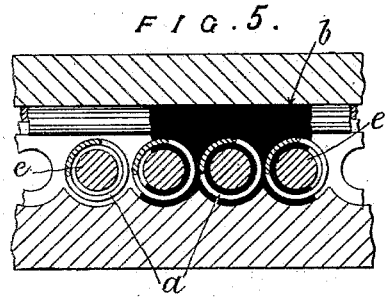
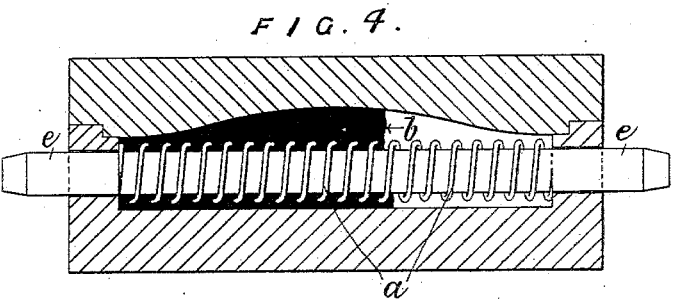
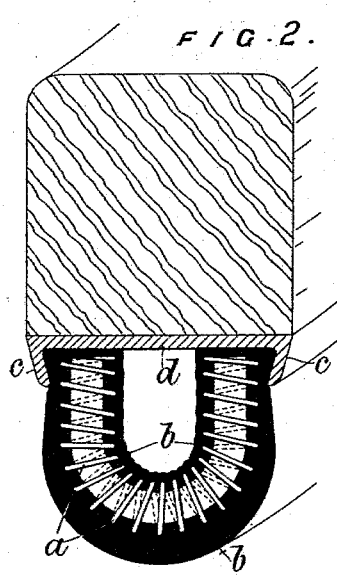
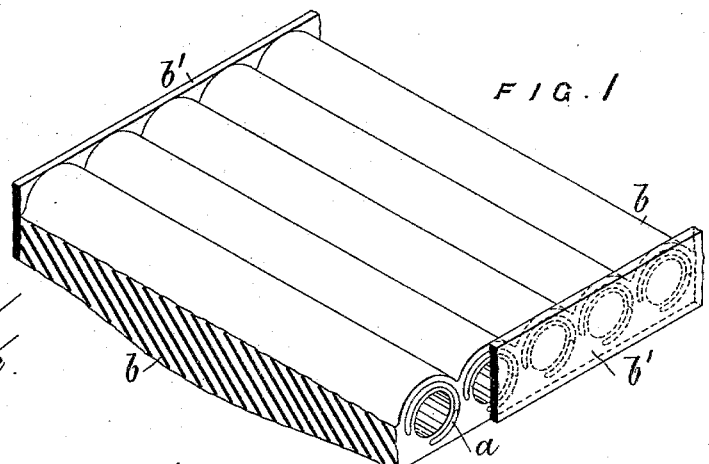
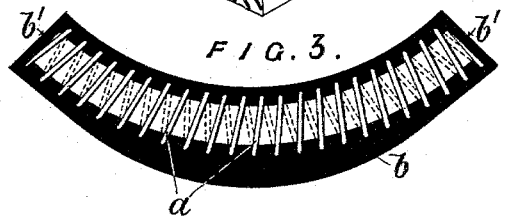
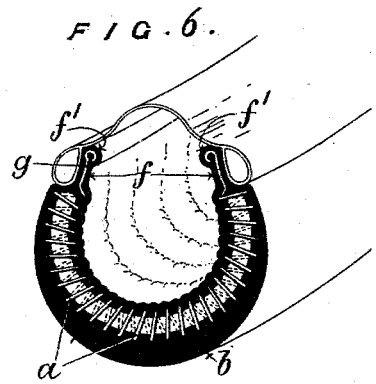
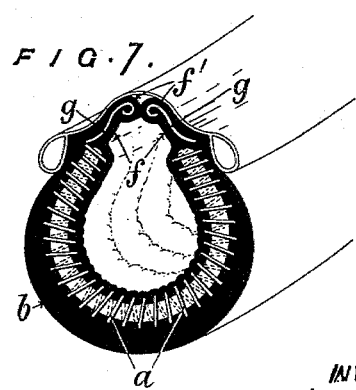
WITNESSES.
INVENTOR:
W. F. Williams
BY
ATTORNEYS.

UNITED STATES PATENT OFFICE.

WILLIAM FREDERICK WILLIAMS, OF LONDON, ENGLAND.

ELASTIC TIRE.

SPECIFICATION forming part of Letters Patent No. 598,043, dated January 25, 1898.

Application filed November 4, 1897. Serial No. 657,374. (No model.)

*To all whom it may concern:*

Be it known that I, WILLIAM FREDERICK WILLIAMS, gentleman, of 32 Shaftesbury Avenue, London, W., England, have invented new and useful Improvements in Elastic Tires, of which the following is a full, clear, and exact description.

My invention relates to elastic tires for the wheels of road-vehicles and velocipedes; and it has for its object to produce a tire combining the advantage of a high degree of elasticity characteristic of a pneumatic tire (without its liability to the consequences of puncture) with the durability and other advantages of a solid rubber tire.

Reference is to be had to the accompanying drawings, forming part of this specification, wherein—

Figure 1 is a perspective view of a portion of the tire-band in the flat. Fig. 2 is a cross-section of the improved tire as applied to the rim of a vehicle-wheel. Fig. 3 is a cross-section of a modified form of tire-band. Fig. 4 is a cross-section, and Fig. 5 a part longitudinal section, of a tire-band mold. Figs. 6 and 7 show cross-sections of two slightly-different forms of the improved tire as applied to a bicycle-wheel rim.

The invention consists in the combination of helical metal springs of circular, oval, or other section with india-rubber (either alone or in combination with canvas or other strong flexible fabric) in the form of a flat or slightly-curved band, wherein the springs are disposed transversely and which when applied to the wheel-rim is brought to an arched or U shape in the direction of its width and is so retained by the edges of the band being confined between side flanges on the wheel-rim. The form and position of the springs are then such that in addition to the tendency of the band to resume its original form and the resistance to flattening of the arched form of the band which the presence of the springs in the rubber imparts each spring (when the weight of the load comes upon it) acts in compression in the direction of its length and under the most favorable conditions for bringing the whole of the elasticity of the spring into play.

In Fig. 1, which shows a portion of the band in the flat, and Fig. 2, which shows the tire as applied to the wheel-rim, *a* are the helical springs embedded in india-rubber *b*, which forms a sheathing for the springs. Instead of using rubber alone I may embed one or more thicknesses of canvas or other strong fabric in the rubber in order to strengthen it.

The springs *a* are closely juxtaposed and are arranged transversely in the band, as shown, the springs being substantially equal in length to the width of the band. They are of steel or other suitable metallic wire, of round or other section, helically coiled to form springs of circular, oval, square, or other suitable form in end view and may be enameled to prevent rust, and their ends may be ground off or otherwise flattened, so that when the springs are embedded in the rubber band and the latter is applied to the wheel the ends of the springs may abut as squarely as possible against their bearing on the wheel-rim. The springs are embedded in the rubber band *b* either by molding and vulcanizing the rubber around them, as hereinafter described, or in any other suitable way, so that the combined elasticity of the rubber and springs will be brought into play and the springs will be protected against moisture. With the same object and in order to afford a more uniform bearing of the tire against the wheel-rim the ends of the springs may, if desired, be covered by strips of rubber or other suitable material cemented to the edges of the band, as shown at *b'*.

The band, with the springs embedded therein, may be made in one length or in several lengths vulcanized together, and the ends of the band would be vulcanized together, so as to form an endless band corresponding in length to the diameter of the wheel-rim, or by means of a suitable annular mold the band might be molded of complete annular form. It may be made either of the flat form shown in Fig. 1 or of the partially-arched form in cross-section shown in Fig. 3 to facilitate the operation of springing the tire into place on the wheel-rim, in which latter case springs tempered of a correspondingly-curved form in the direction of their length would be used. In either case it would generally be preferable that there should be a greater thickness of india-rubber (either alone or with canvas or other strong flexible fabric embedded therein) at the outer than at the inner side of the band, especially toward the middle of its width, to form an adequate sheathing for the springs where the tread of the tire or its point of contact with the ground will be. The rubber might, however, be otherwise disposed relatively to the springs, if required.

The endless band when applied to the wheel-rim is bent or arched transversely to a U shape, as shown in Fig. 2, and its edges are sprung into confinement between the inwardly-inclined side flanges $c$ of a metal rim $d$ (similar to that used for solid rubber tires) in the case of ordinary road-vehicles, whereby the elastic tire is securely retained owing to the combined tendency of the rubber and springs to cause the tire to resume its original form and dimensions.

A suitable mode of embedding the springs in the rubber is to thread them upon core-pins $e$, as shown in Fig. 4, supported in a two-part mold, so that when the mold is filled with plastic rubber and submitted to pressure the rubber will be caused to envelop as completely as possible the section of the wire at all points of the spring, the core-pins, which are so much smaller than the interior diameter of the springs as to allow of this, being withdrawn after molding and vulcanization. Any other suitable form of mold and mode of manufacture may, however, be adopted.

In the case of a tire for bicycle-wheels the form of tire above described may be used for wheel-rims of the "clencher" pattern; but in order to adapt the tire to be applied to the various other forms of rim now in use it is preferred to provide the band with lateral extensions of rubber, rubber-coated canvas, or other suitable material of reduced thickness, as at $f$, Figs. 6 and 7, stiffened by the partially uncoiled or straightened end portions $g$ of the springs being embedded in them. In this case the springs would not be ground off square at the ends, as above mentioned, but would be prolonged, as at $g$, these prolongations being straight or bent of any required shape and the extensions $f$ being beaded, as at $f'$, or otherwise adapted to engage with the wheel-rim, as shown in Figs. 6 and 7, the coiled part of the springs either abutting against the edges of the rim, as shown in Fig. 6, or entering between them, as in Fig. 7, when the tire is bent to the arched form shown in those figures and applied to the wheel-rim. In the form shown in Fig. 7 the spring-stiffened lateral extensions of the band meet at the bottom of the groove of the wheel-rim, so as to prevent the farther entry of the tire into the hollow of the rim, while assisting the beads $f'$ to retain the tire in position.

I claim—

1. The herein-described elastic tire for wheels, consisting of a band of rubber, or rubber and canvas or other suitable material, having juxtaposed transversely-extending spiral springs embedded therein, the band being transversely arched to a U form when applied to the wheel-rim and being retained thereon by being sprung into engagement therewith, substantially as specified.

2. The herein-described elastic tire for wheels, consisting of a band of rubber, or rubber and canvas or other suitable material, having juxtaposed transversely-extending spiral springs embedded therein, the band being provided with lateral extensions of rubber, or rubber-coated canvas or other suitable material, stiffened by non-coiled prolongations of the springs extending to the edges of the said extensions, the band being transversely arched when applied to the wheel-rim and being retained thereon by the engagement of the said lateral extensions therewith, substantially as specified.

WILLIAM FREDERICK WILLIAMS.

In presence of—
T. W. KENNARD,
C. J. CLARK.